United States Patent Office 3,166,385
Patented Jan. 19, 1965

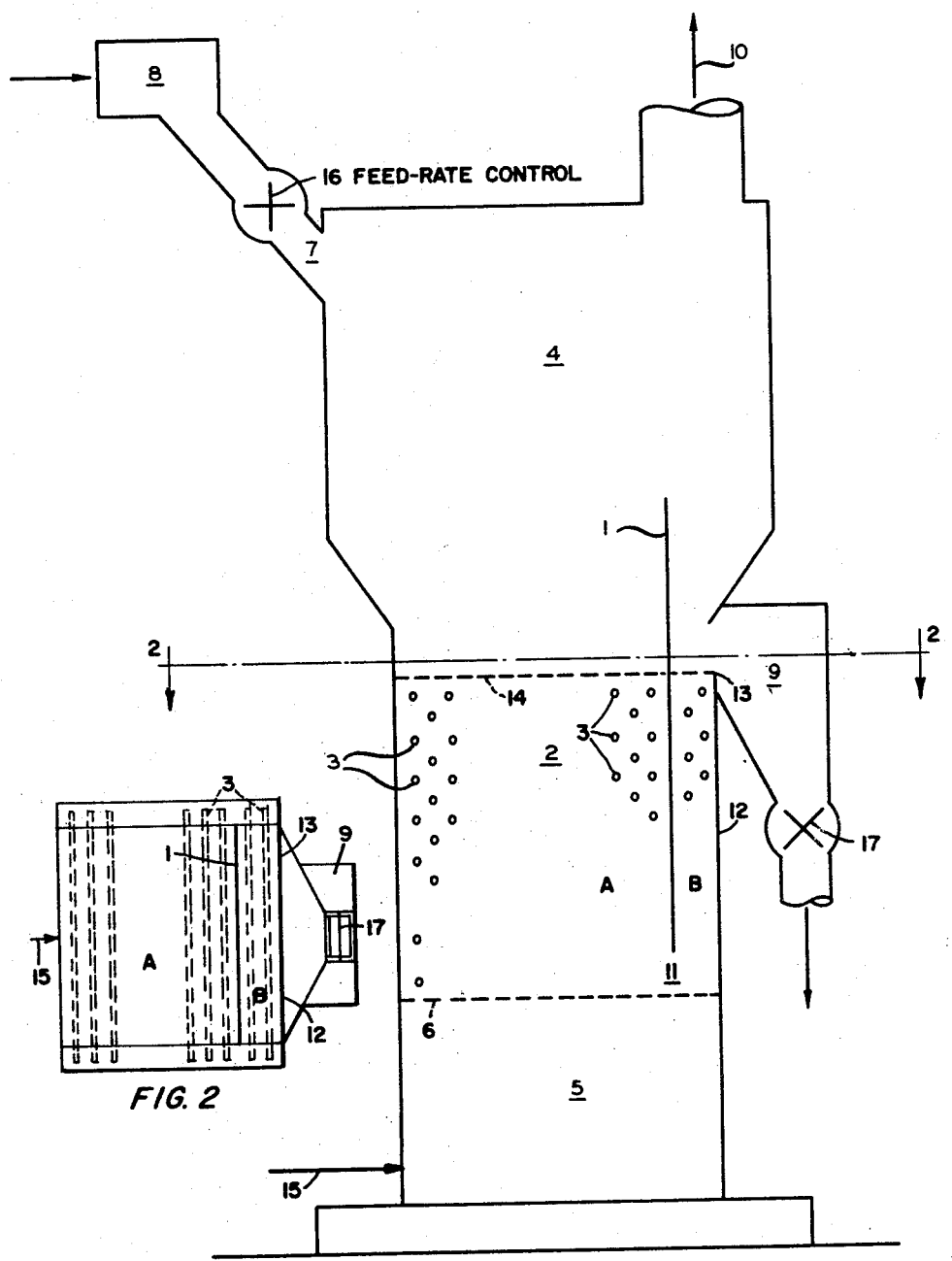

3,166,385
SEALED FLUIDIZATION CHAMBER
Marcel Pahlavouni, Brussels, Belgium, assignor to Solvay & Cie., Société en Commandite, a simple of Belgium
Filed Jan. 13, 1961, Ser. No. 82,426
Claims priority, application Belgium Jan. 20, 1960
1 Claim. (Cl. 34—57)

The present invention concerns a process for continuous drying of particles of thermoplastic material and an apparatus for carrying out the process.

By "drying," is meant herein, the separation of water, of solvent, of a mixture of water or solvent, or of any other liquid which may impregnate the particles of the thermoplastic materials.

It is known that the drying of thermoplastic materials constitutes a delicate operation, for these products are sensitive to heat and oxidation. The time for drying must be regulated as a function of various factors such as the nature of the product, its degree of wetness or impregnation upon entry into the drier, and the degree of residual wetness or impregnation which can be tolerated in the product which exits from the drier. On the other hand, the temperature cannot exceed a certain level at any place, for, otherwise, fusion and/or degradation of the polymer would result. The drying of thermoplastics is particularly difficult when these are impregnated with inflammable solvent. In this case, special precautions must be taken in order to avoid fires and explosions. Diverse types of equipment have already been proposed for the drying of solid particles of thermoplastic materials, for example, vacuum driers utilizing an air current, vertical driers using hot air, and rotary driers provided with steam tubes. These latter apparatus units are characterized by the facility for regulating drying conditions and by the possibility of continuous operation; however, they are cumbersome and costly, and, furthermore, their use is not indicated when the drying is accomplished in an atmosphere of inert gas, for the lack of airtightness of these apparatus units can cause loss of inert gas and of solvent on the one hand and the entry of air with resulting oxidation of the thermoplastic material and risk of explosion on the other hand.

All these disadvantages can be avoided by effecting the drying in an apparatus utilizing a fluidized bed. The description of an apparatus of this type, especially adapted for the treatment of plastic materials, has already been published (Chemie-Ingénieur-Technik, 1957, pages 411 and 467), but it is applicable only to discontinuous drying. The author of that publication points out, among other things, that uncertainty exists as to the possibility of designing a fluidized-bed drier which functions continuously for the treatment of materials which are sensitive to heat.

The applicant has now found that continuous drying of thermoplastic materials in the form of a fluidized bed is entirely possible provided one observes certain conditions and utilizes appropriate apparatus.

The present invention has as an object a process for drying particles of thermoplastic materials in a fluidized bed, characterized in that one operates continuously and utilizes a zone of fluidization provided with a tight network of heat exchange tubes, the temperature of the tubes being maintained at such a level that the temperature of the bed does not exceed the softening point or the point of degradation of the thermoplastic material to be dried, and the time of drying being determined by the rate at which one introduces the wet material into the bed.

The heating tubes can be heated by means of steam, hot gas, etc. They must be separated from each other and from the walls of the enclosure by a sufficient interval to maintain good fluidization and, consequently, a good heat transfer coefficient, and in order not to cause aggregation of the material. A suitable arrangement for the tubes can be obtained, for example, by installing horizontal and vertical coils and joining their ends to headers; a favorable arrangement of the tubes is an arrangement in quincunx, for this increases the heating surface per unit of volume. It is desirable to provide, in the upper part of the fluidized bed, a bed level above the uppermost level of the tubes, in order to insure that the particles of wet product introduced do not enter into immediate contact with the tubes; this depth left free varies according to the nature of the material treated and the conditions chosen for drying, but one can estimate it as approximately one-tenth of the total depth of the fluidized bed.

It is desirable to maintain the temperature of the bed at a value sufficiently high that drying is complete and the gas withdrawn from the fluidized bed is not saturated. In order to insure a sufficient supply of heat, it is necessary that the temperature of the heating tubes be greater than the temperature of the bed (temperature difference, 10 to 50° C., for example). On account of the agitation in a fluidized bed and the evenness of temperature which results, the temperature of the tubes can reach a level higher than the softening temperature or the degradation temperature of the thermoplastic material so long as the temperature of the bed does not exceed that level. Even if the difference between the temperature of the tubes and that of the bed is small, the supply of heat by the tubes immersed in the bed is important because the coefficient of heat transfer is increased and the bundle of tubes presents a large heat exchange surface.

It is also feasible to preheat the gas for fluidization prior to introducing it into the bed, but it is necessary to prevent the preheating from raising the temperature of the gas to a temperature above the softening point or the point of degradation of the thermoplastic material. The quantity of heat which can be supplied by the fluidization gas is substantially less than that which can be supplied by the tubes.

The continuous removal of the dried product is based on the fact that fluidized beds behave like liquids and follow, among other things, the law of communicating containers.

In the accompanying drawing, FIGURE 1 represents a sectional elevation of an apparatus in accordance with the present invention.

FIGURE 2 is a plan view, in section, taken along line 2—2, of FIGURE 1.

The fluidization zone, as illustrated in the drawing, is divided into two or more compartments A and B which communicate with each other, these compartments being defined by partition 1, which extends downwardly but terminates short of plate 6, thus forming passageway 11 between compartments A and B; thus the fluidized material is forced to pass downwardly through one compartment (A), through passageway 11, to the other compartment (B), and the thoroughness of the drying is appreciably increased. If desired, these successive compartments can be formed by several driers placed in series. According to one variant, one can, for example, divide the fluidization zone into two compartments, the first, having a larger volume, serving for the drying proper, the second, having a smaller volume, serving for finishing and directing the product toward the exit. All of the drying compartments are furnished with heat exchange tubes 3; optionally, these compartments can be maintained at different temperatures. On the exterior wall 12 of the exit compartment B, a little above the uppermost level of the tubes 3, is positioned a weir which empties into a conduit 9 through which the dried material is removed after moving upwardly through compartment B. This weir thus automatically regulates the level 14 of the bed and maintains level 14 below the top of partition 1.

Below the fluidization zone, there is a chamber 5 for distribution of the gas. This distribution zone communicates with the fluidization zone through a perforated plate 6 or other suitable device. If desired, the gas introduced into this chamber (inlet 15) can be preheated.

Above the fluidization zone, and in direct communication therewith, there is provided a disengagement chamber 4 of suitable height and having, preferably, a cross-sectional area greater than that of the bed. One can, for example, provide this chamber with a cross-sectional area approximately double that of the fluidization zone. In the wall of the disengagement chamber, there is, on one side, means for introducing the material to be dried, and, on the other side, a conduit for removal of exit gas and vapor.

In order to avoid loss of gas, one can provide means 16 and 17, such as star valves, for example, for rendering the apparatus gas-tight, such means being placed at the inlet for introduction of the product to be dried and in the exit conduit for the dried product. This precaution is especially necessary when one uses an inert gas as fluidizing agent.

Finally, it is useful to adapt the dimensions of the particles to be dried in accordance with the available fluidization gas. If necessary, the product to be dried is treated in a chopper or other suitable apparatus prior to introduction into the drier.

In order to illustrate the invention without limiting the same, a specific example of operation is given subsequently herein.

The invention can be applied to the treatment of thermoplastic materials, for example, polyolefins, polyvinyl chloride, copolymers, etc., regardless of the process by which said materials are obtained and of the liquid to be evaporated (water, organic solvent, or mixture).

Example

Particles of polyethylene, obtained by polymerization under low pressure, in the presence of a catalyst comprising chromium oxide and silica and/or alumina and in the presence of cyclohexane are to be dried. The effluent solution of polymer in cyclohexane has a temperature of approximately 150° C. and a pressure of 5 to 6 kilograms per square centimeter. Water at 40° C. is added and steam is passed through the mixture to vaporize the cyclohexane and obtain an aqueous slurry of polymer at about 88° C. The polymer, which is lighter, floats and is withdrawn by skimming. The particles have a mean dimension of two millimeters and contain a very large quantity of water.

The product is passed into a chopper wherein the particles are reduced to about 0.8 millimeter in diameter, the proportion of water present being about 0.60 kilogram per kilogram of dry polymer. It is to be noted that the particles of polymer obtained by precipitation in water retain proportionately more water prior to chopping than after this operation, so that it is advantageous to separate this liquid water prior to introduction of the polymer into the drier.

As shown in the accompanying drawing, the drying is effected in an apparatus of the type described, partition 1 forming two unequal compartments A and B. The installation comprises a fluidization zone 2 (about 2.3 cubic meters) provided with one-inch metallic tubes 3, whose total surface in the bed is about 40 square meters. These tubes are separated one from the other and from the walls by an interval of approximately 40 to 45 millimeters. Steam is passed through them at about 2 atmospheres absolute, i.e., they are maintained at about 120° C., the steam being used at a rate of 235 kiograms per hour.

The wet polyethylene, previously chopped in 8, is introduced into 7 and into the disengagement zone 4 of the drier at a rate of 472 kilograms per hour (controlled by star valve 16) and passes by gravity into fluidization zone 2.

Nitrogen at 44° C. and containing 0.065 kilogram of water per kilogram is introduced into the gas distribution chamber 5 through inlet 15 at a rate of 18 kilograms of dry gas per hour. This chamber communicates with fluidization zone 2 through the perforations of a perforated plate 6. The temperature of the fluidized bed under the conditions thus defined is approximately 81° C.

The withdrawal of dried product through exit 9 corresponds automatically to the continuous introduction of wet polymer at 7 and is regulated by star valve 17. The mean residence time of the particles in the drier is about 2 hours. Their water content at the exit is no more than 0.004 kilogram per kilogram of dried polymer.

The fluidization gas leaves the apparatus at outlet 10 at a temperature of 78° C. and a water content of 0.161 kilogram per kilogram of dry gas. The entrainment of polymer fines by the exit gas is of the order of 0.8 percent.

In the case of treatment of low-pressure polyethylene, as in the foregoing example, the temperature of the tubes must be regulated so that the temperature of the bed does not exceed the softening point of the polymer. One thus avoids fusion of the product on the tubes or on other hot points which may exist in the apparatus. The polyethylene of the example has a softening point of about 125° C. according to the Vicat method (ASTM No. D-1525) based on a load of 1 kilogram.

Certain other polymers are degraded by heat even before reaching their softening point. This is especially true of polyvinyl chloride, which has a Vicat softening point of the order of 85 to 100° C. under a load of 1 kilogram, but which, depending upon the conditions maintained in the drier, can be degraded between 70 and 95° C. It is quite evident that when one treats these products the temperature of the tubes must be such that the temperature of the bed does not reach the degradation point of the polymer.

While certain structures, examples and process steps have been described for purposes of illustration, it is clear that the invention is not limited thereto.

I claim:

Apparatus for continuous drying of thermoplastic, particulate solids in the form of a fluidized bed, said apparatus comprising, in combination:

a fluidization chamber;

a gas inlet chamber directly below said fluidization chamber and connected to a source of gas;

gas distribution means separating said fluidization chamber from said inlet chamber;

heat exchange tubes positioned in said fluidization chamber and connected to a source of heat exchange fluid;

a disengagement chamber, directly above said fluidization chamber, having a greater cross-sectional area than said fluidization chamber, and in open communication therewith;

gas-tight means for feeding solids continuously, at a controlled rate, into the upper part of said disengagement chamber;

a gas outlet in the upper part of said disengagement chamber;

a generally upright partition in said fluidization chamber, dividing said chamber into a main drying compartment and a finishing compartment in open communication with each other at their lower ends, said partition being adapted to direct flow of solids from said solids supply means into said main drying compartment and subsequently into said finishing compartment;

solids withdrawal means in communication with the upper part of said finishing compartment, said withdrawal means being provided with gas-tight valve means for regulating solids flow;

and a weir positioned between said finishing compartment and said solids withdrawal means and adapted to regulate solids flow from said finishing compartment into said solids withdrawal means.

References Cited in the file of this patent

UNITED STATES PATENTS

| | | |
|---|---|---|
| 2,513,369 | Shaw | July 4, 1950 |
| 2,536,099 | Schleicher | Jan. 2, 1951 |
| 2,629,938 | Montgomery | Mar. 3, 1953 |
| 2,797,908 | Zubrzychi | July 2, 1957 |
| 2,761,668 | Sylvest | Sept. 4, 1956 |
| 2,824,723 | Turney | Feb. 25, 1958 |
| 2,893,849 | Krebs | July 7, 1959 |
| 2,916,831 | McCosh | Dec. 15, 1959 |